United States Patent [19]

Georgiou

[11] Patent Number: 4,829,511
[45] Date of Patent: May 9, 1989

[54] SWITCHED NETWORK OF OPTICAL BUSES

[75] Inventor: Christos J. Georgiou, White Plains, N.Y.

[73] Assignee: International Business Machines Corporation, Armonk, N.Y.

[21] Appl. No.: 108,335

[22] Filed: Oct. 14, 1987

[51] Int. Cl.⁴ .............................................. H04B 9/00
[52] U.S. Cl. .................................... 370/4; 340/825.82; 340/825.85; 370/1
[58] Field of Search ............... 455/600, 601, 606, 607, 455/612, 617; 370/1, 3, 4, 53, 54; 340/825.81, 825.82, 825.85, 825.89; 379/166

[56] References Cited

U.S. PATENT DOCUMENTS

| | | | |
|---|---|---|---|
| 4,292,476 | 9/1981 | Yamamoto et al. | 379/165 |
| 4,677,437 | 6/1987 | Kajiyama et al. | 340/825.82 |
| 4,710,917 | 12/1987 | Tompkins et al. | 370/62 |
| 4,736,462 | 4/1988 | Joel, Jr. | 455/600 |

FOREIGN PATENT DOCUMENTS

| | | | |
|---|---|---|---|
| 3503364 | 8/1986 | Fed. Rep. of Germany | 455/601 |
| 0202690 | 11/1983 | Japan | 370/3 |

Primary Examiner—Robert L. Griffin
Assistant Examiner—Leslie Van Beek
Attorney, Agent, or Firm—Jack M. Arnold

[57] ABSTRACT

A switching apparatus and adjustable time delay protocol to provide switching between N processor system devices in which each device is connected via N+S fibers to N+S switching planes, with one fiber being used for the connection from a device to one of the N+S switching planes. N fibers provide the desired bandwidth and S fibers are used as standby fibers in the event of failure of any of the N fibers. An additional C fiber from each device to a single matrix controller are used to provide control information. The single controller provides control for all N+S switching planes. Each switching plane converts the optical signals that are received over M fibers to electrical signals. The electrical signals are then switched and converted to optical signals by the respective switching planes. Thus, each of the optical signals received over each of the M fibers are transmitted to a respective other one of the M fibers.

2 Claims, 6 Drawing Sheets

SWITCHED NETWORK OF OPTICAL BUSES

DESCRIPTION

1. Technical Field

The invention is in the field of switching systems, and specifically is directed to a switching apparatus and protocol to provide switching between processor system devices. In particular, a switching system is utilized in which optical fibers connect the processor devices to the respective switching planes in the switching apparatus.

2. Background Art

Computers and dats processing systems of the future will in general need to be designed for operating speeds substantially higher than those of present day equipment. The operating speed of single processor has reached a limit that is not likely to be sufficiently extended with foreseeable technology to meet these future requirements. A common approach has been to use multi-processor systems in which theoretically the operating speed of the system is the sum of the speeds of the individual multi-processors. One form of such a multi-processor system is disclosed in U.S. Pat. No. 4,695,999 entitled, "Cross-point Switch of Multiple Autonomous Planes" by G. Lebizay, filed Sept. 2, 1986, which application is assigned to the assignee of the present invention. Lebizay connects the multi-processors through a multi-plane cross-point switching system in which a communication message from a sender is divided into a plurality of data links that are separately connected through autonomous cross-point switches to the receiver where the links are recombined. The crosspoints in each plane are separately set by control messages transmitted along with the separate parts of the divided message.

A roughly analogous switching system is described in U.S. Pat. No. 4,015,204 to Miyazawa in which data are switched into parallel registers which are then used to modulate different carrier frequencies on a single transmission line. Wide band switching is itself a known idea, as discussed by Teraslinna in U.S. Pat. No. 4,402,008. Parallel planes of circuits for either storage or switching have been described by Mansuetto et al. in U.S. Pat. No. 3,321,745 and by Burns in U.S. Pat. No. 3,355,721.

High performance parallel computer systems require a high bandwidth communications mechanism in order to realize the benefits of parallel processing. Optical fibers have emerged as the natural transmission medium for such an interconnection scheme because of their clear advantages over copper transmission lines, such as high speed transmission capability, immunity to noise, and reduction in cable bulkiness and cost.

The prior art describes various interconnections of optical fibers, without, however, focusing on the issue of performance of system control, cost and performance of internal switch interconnections. More specifically:

U.S. Pat. No. 4,470,154 to Yanco presents a 4×4 multiplexor of single optical lines, in which one input can connect from 1 to 4 outputs. Only one connection is allowed at any given time (blocking switch) and control is passed via inband signalling. This patent does not address the problem of control in buses of multiple fibers.

U.S. Pat. No. 4,397,016 to Broussand describes a space switching system which is used to switch signals in a time-division multiplex (TDM) mode. The sampling of the inputs to perform the TDM function and subsequent control for the time slots in the switching mechanism is undertaken by a service processor.

U.S. Pat. No. 4,381,881 to Bell describes a crossbar switch which uses an optical-to-electrical-to-optical conversion to implement the switching matrix. Control is accomplished manually. This is a truly costly, inefficient and slow way of accomplishing switching.

U.S. Pat. No. 3,986,020 to Kogelnik describes a system of optical switching by means of opto-acoustical interactions. This system can provide high-bandwidth switching over single lines but suffers from slow connection set-up times.

U.S. Pat No. 4,306,313 to Baldwin describes an optical star switch. It uses a broadcasting technique to propagate the signals which results in only one connection being active at any given time.

U.S. Pat. No. 4,475,187 to Barabas describes a switching matrix which uses ECL logic circuits to minimize crosstalk.

There are a number of pages which discuss, in the general sense, the use of fiber optics in local area networks or the like.

An article in the IEEE Transactions on Cable Television, Vol. CATV-2, No. 3, July 1977 entitled "Conceptual Design of a Switched Television-Distribution System Using Optical-Fiber Waveguides" by E. H. Hara discloses the concept of transmitting television signals through analogue transmission systems for long distances without the use of repeaters.

An article in International Fiber Optics Communications, November/December 1982, entitled "Local Area Networks, in Fiber" by Y. Pingry discloses in general how fiber optics are used in local area networks. There are no teachings relative to protocols for operating such networks.

An article in International Fiber Optics Communications, Summer 1982, entitled "The Fibervision Trial at Milton Keys" by J. Fox, discloses the implications of fiber optics in local area networks. As in the Pingry article, there is no mention of protocols for operating such networks.

In spite of their high speed transmission capability, however, single fibers cannot achieve the bandwidth required by high-end systems. Thus, parallel data transmissions through multiple fibers must be employed.

Such a parallel transmission scheme is disclosed in U.S. patent application Ser. No. 933,309 entitled, "Switching Protocol for Multiple Autonomous Switching Planes" filed Nov. 21, 1986, by G. Lebizay, et al. Key Features of that application are as follows: the data transmission is broken into n frames to be transmitted over n+s serial links, where s represents spare links for availability purposes. Each one of the links is switched via a non-blocking cross-point switching plane, which permits the establishment of transmission paths to all interconnected system devices. The data frames are serially transmitted on each link, asynchronously to each other. Control information for switching to the desired destination is included in the data frame (band signalling) and each switching plane uses its own controller to extract the destination information and establish or break a connection.

Lebizay et al. approach has the advantages of high modularity and availability. However, it does have the following two significant disadvantages:

1. Cost of the switching planes. (All planes require, in addition to a swtching matrix, high speed electronics for serialization/deserialization of the data stream, buffering and control at each port plane plus a high-speed matrix controller).

2. Delays in the establishment of connections due to the required protocol to avoid contention problems among the various switching planes.

It is the above limitations of the previous art that this invention addresses and eliminates.

According to this invention, multiple planes are also used to achieve the necessary data transfer bandwidth and availability. However, the transmission of the control information has been separated from the transmission of data (Outband signalling).

The data planes have been significantly simplified over the corresponding planes of the Lebizay et al. approach. The optical signal in a fiber arrives at its corresponding receiver on the plane, where it is converted into a stream of electrical pulses. Without performing any clock extraction or deserialization, the pulse stream is fed into a cross-point switching matrix, wherein it is directed to the transmitter corresponding to the destination fiber. At the transmitter, the electrical pulses are converted into optical pulses. Clocking, synchronization and deserialization is performed only at the destination device.

As a result of the separation of the transmission of data from the signalling information, it is possible to construct switching planes with very low hardware complexity. This, in turn, makes possible the realization of compact and inexpensive high-performance switching systems, which approach the complexity of optical switching without, however, the latency and capacity problems associated with such technologies.

DISCLOSURE OF THE INVENTION

A switching apparatus and adjustable time delay protocol are disclosed to provide switching between N processor system devices in which each device is connected via N+S fibers to N+S switching planes, with one fiber being used for the connection from a device to one of the N+S switching planes. N fibers provide the desired bandwidth and S fibers are used as standby fibers in the event of failure of any of the N fibers. An additional C fiber from each device to a single matrix controller are used to provide control information. A second C fiber could be used for availability purposes in a standby (spare) mode. The single controller provides control for all N+S switching planes. Each switching plane converts the optical signals that are received over M fibers to electrical signals. The electrical signals are then switched and converted to optical signals by the respective switching planes. Thus, each of the optical signals received over each of the M fibers are transmitted to a respective other one of the M fibers.

BEST MODE OF CARRYING OUT THE INVENTION

Figure 1:
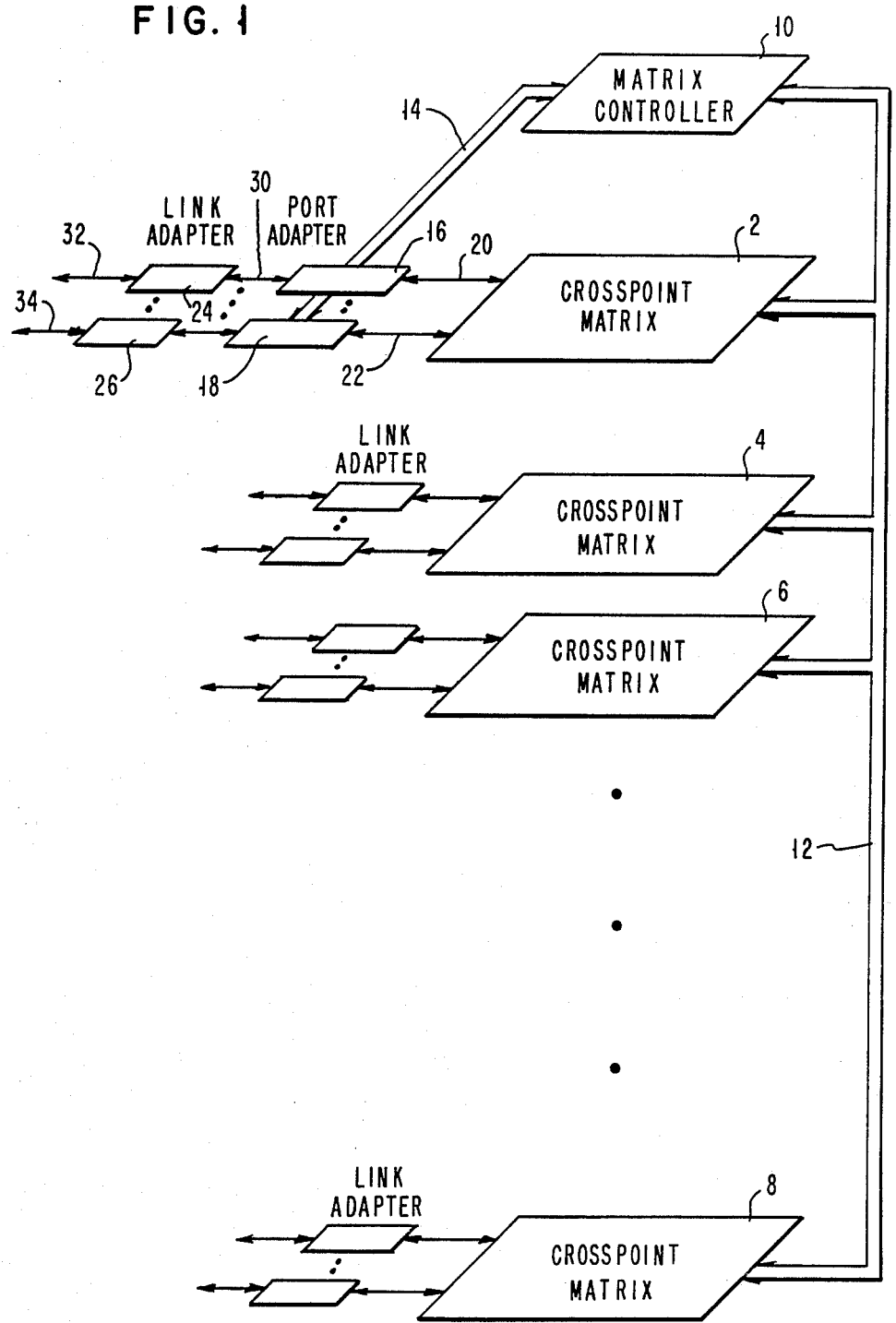
FIG. 1 is a schematic diagram representation of a multiple-plane switching system with outband signalling.

FIG. 1 illustrates a multiple plane switching system with outband signalling. That is, in one controller controls all of the switching planes of the cross-point matrix. The cross-point matrix is comprised of switching planes 2, 4, 6 and 8 under control of a matrix controller 10 via a control bus 12. The controller also controls port adapters 16 and 18 via a control bus 14. The adapters 16 and 18 are connected to the switching plane 2 via electrical cables 20 and 22 respectively. They contain deserialization circuitry, clock extractions and two buffers. Link adapters 24 and 26 are connected to the port adapters 16 and 18 via electrical links 28 and 30 respectively. The link adapters convert optical to electrical signals. The link adapters 24 and 26 are connected to nodes, for example utilization devices such as processors (not shown) via fiber optic links 32 and 34. The switching planes 4, 6 and 8 are data planes and do not have a controller or port adapter connection.

The respective data planes have been significantly simplified over the corresponding planes as set forth in the previously referenced U.S. patent application entitled "Switching Protocol For Multiple Autonomous Switching Planes". The optical signal in a fiber arrives at its corresponding receiver on the plane link adapter, where it is converted into a stream of electrical pulses. This is accomplished without performing any clock extraction or deserialization. The pulse stream is fed into a cross-point switching matrix where it is directed to the transmitter corresponding to the destination fiber. At the transmitter, the electrical pulses are converted into optical pulses. Clocking, synchronization and deserialization is accomplished only at the destination node or device, for example, at the receiving processor.

Figure 2:
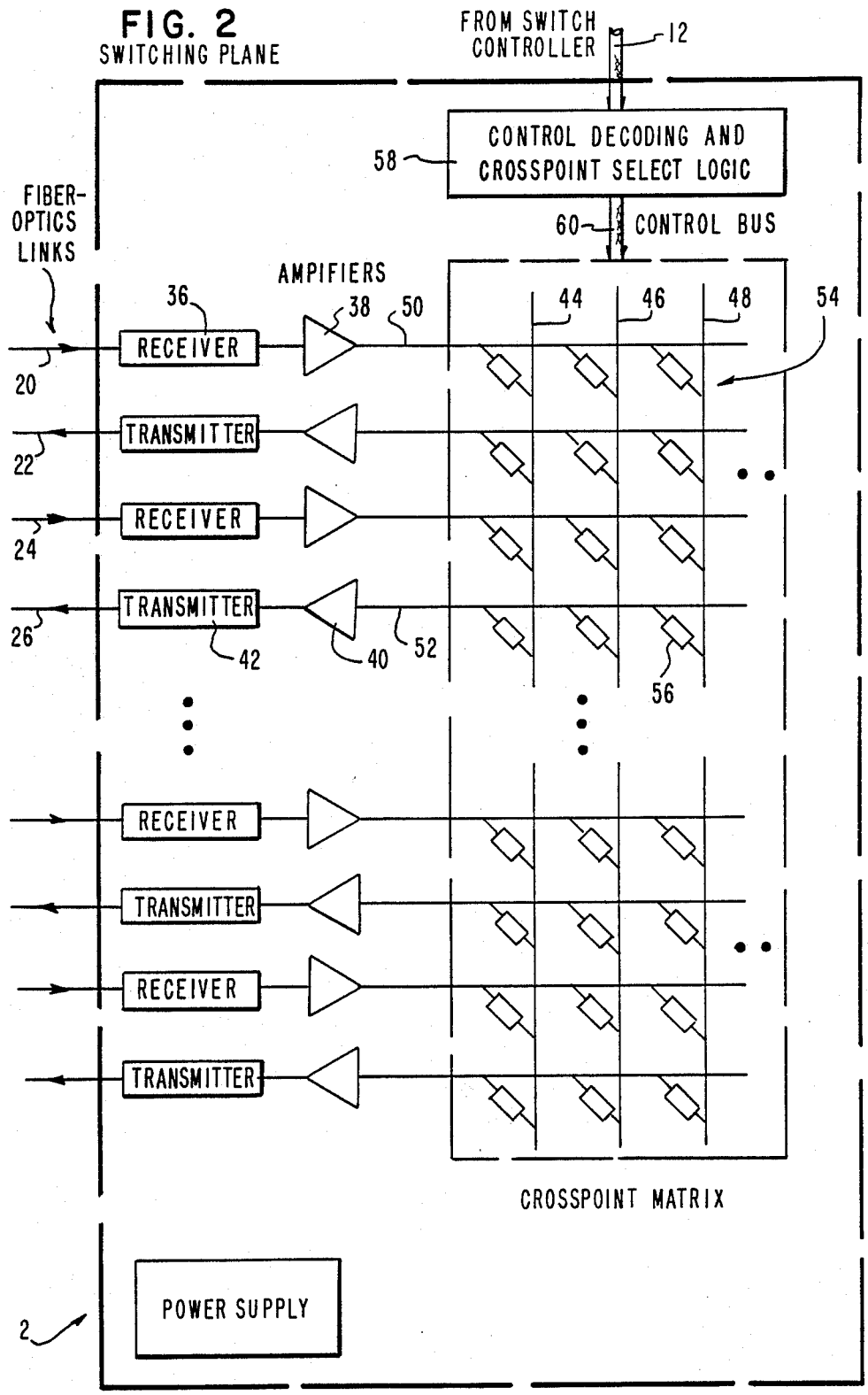
FIG. 2 is a detailed schematic diagram of the switching planes.

FIG. 2 is a more detailed representation of the cross-point matrix configuration. The switching plane 2 receives optical data signals from a processor node via fiber optic link 20 and transmits optical signals to same via fiber optic link 22. Another processor node is connected to switching plane 2 via the fiber optic link pair 24, 26. The received optical signals from a node are converted to electrical signals in a receiver 36 and provided via an amplifier 38 to the switching plane 2. The amplifier 38 reshapes and amplifies the electrical pulses generated by the receiver 36. Signals to be transmitted from the switching plane 2 are provided via an amplifier 40 to a transmitter 42 which converts the electrical data signal to an optical data signal which is provided via the fiber optic link 26 to the destination node or utilization device. The cross-point matrix is comprised of columns 44, 46 and 48, which are selectively connected to rows such as the rows 50 and 52. For example, if it is desired to connect row 50 to row 52 the control decoding and cross-point select logic 58 receives a switching signal from the controller via the control bus 12 and provides this signal via control bus 60 to switching elements 54 and 56, which when activated connects lines 50 and 52. One form of such a cross-point matrix is disclosed in U.S. Pat. No. 4,635,250, entitled "Full-Duplex Cross-Point Switch" by C. Georgiou and assigned to the assignee of the present invention. The centralized controller may be duplicated (duplexing) or triplicated (TMR) to provide the desired availability. A representative controller is set forth in U.S. Pat. No. 4,630,045, entitled "Controller For A Cross-Point Switching Matrix" to Georgiou, which patent is assigned to the assignee of the present invention.

A protocol for passing the connect/disconnect information to the switch controller is needed which minimizes the data transfer delay. One such scheme is set forth below.

Assuming that an 8B/10B transmission code is used, a short control frame is constructed at the node or device which needs to transmit data (consisting, for example, of a connect/disconnect character delimitter, destination address and ending delimiter for a total of 4-5 characters) which is, then, sent to the switch control plane. This plane should have at each port, serializer/deserializer circuits, as well as buffers to store the frame until the controller can process it. Once the controller determines that the connection can be established, it sends to the transmission node originator a one or two character control frame, indicating that the data transmission can begin. Concurrently, it activates the appropriate cross points at each plan to establish the connection. This is accomplished on a common bus which runs from the controller to each of the switching planes. This bus could also be duplicated for availability purposes.

If the destination node is busy, a busy control frame is sent to the originator node which can retry later. An alternative to the busy signal is to queue the request until the destination becomes available. When the acknowledgement frame is received at the originator node, the data frames can be transmitted. The delay involved in a data transmission, therefore, depends on how fast the request can be processed by the controller and on the transmission delay of connect and acknowledgement control frames to/from the cross-point matrix switch. Propagation delay of signals on fiber are as follows: approximately 5 nsecs/meter for cases where system is confined in small area, e.g. glass-house computer center - 100 meters, propagation delay is <1 $\mu$secs. For longer distances, control frame propagation delay becomes significantly larger. Two protocols are proposed; one with acknowledgement and another without acknowledgement. The latter minimizes delay.

Figure 3:
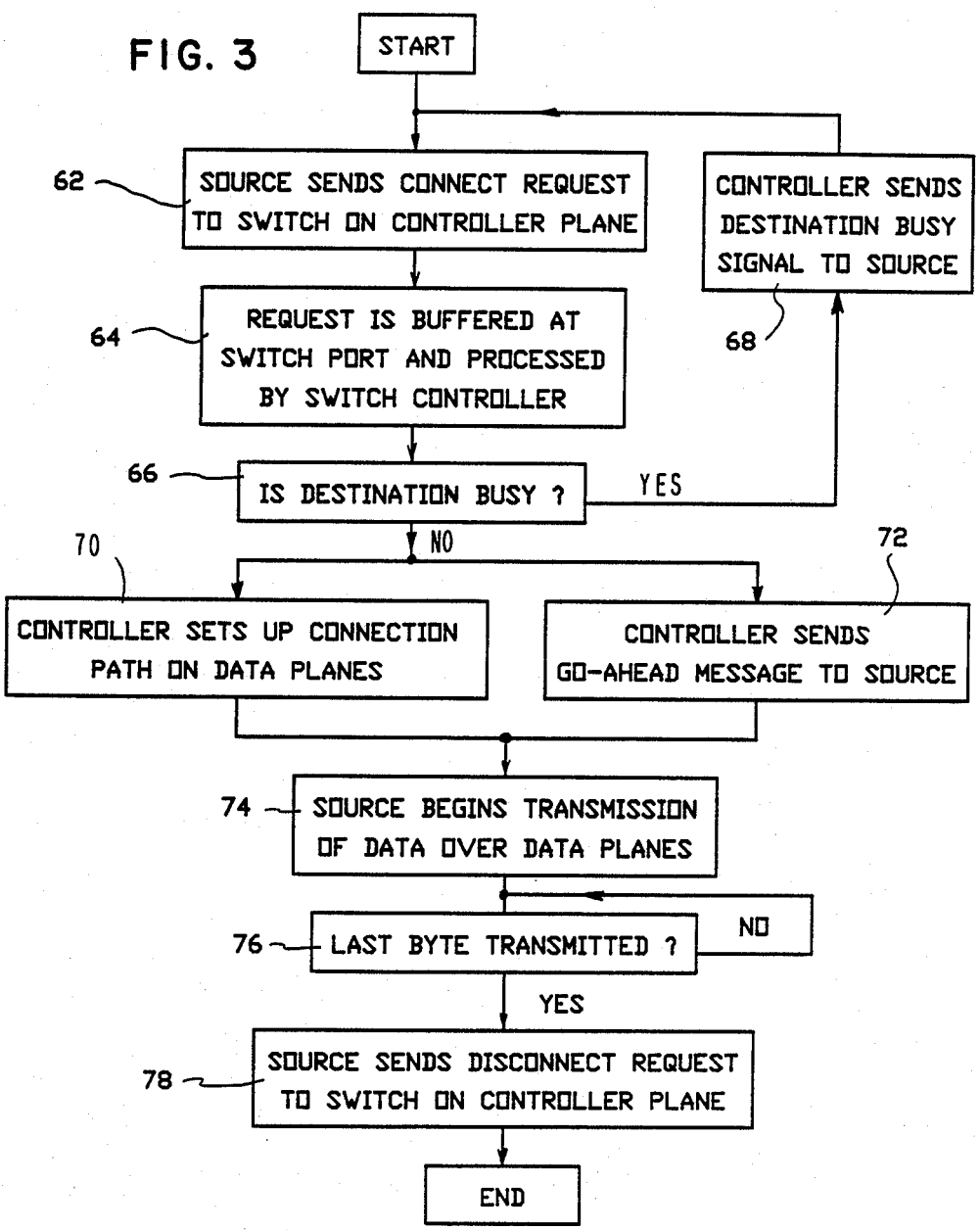
FIG. 3 is a flow chart of a controller protocol that requires acknowledgement.

A protocol that requires acknowledgement is set forth in FIG. 3. This flow chart is indicative of the operations that take place in, and under control of the matrix controller 10 illustrated in FIG. 1. The request starts, and as indicated at 62 the source node processor sends a connect request to switch on the control plane. As indicated at 64, the request is buffered at the switch port and processed by the controller. As indicated at 66, a query is made to determine if the link to the destination processor is busy, If the processor link is busy, the controller then sends the destination busy signal to the source processor as indicated at 68. If the destination is not busy, the controller sets up a connection path on the data planes as indicated at 70 and concurrently sends a go ahead message to the source as indicated at 72. The source then begins transmission of data over the data planes as indicated at 74. This continues until the last byte is transmitted as indicated at 76. Once that the last byte has been transmitted, the source then sends a disconnect request to the controller plane as indicated at 78, and the process ends.

An alternative method for minimizing the control frame round trip delay is to eliminate the acknowledgement portion of the protocol indicated at 72. This may be accomplished by first transmitting the connect control frame and then transmitting the data, after delay which corresponds to the time needed for the controller to activate the cross points (when no requests are queued, or with a given number of requests pending). If the destination is available and the number of queued results is below the established threshold, the data will be passed to the destination node. The controller can then send to the originator node a "data passed through" control frame. If the data does not get through, a "retry" control frame is sent.

Figure 4:
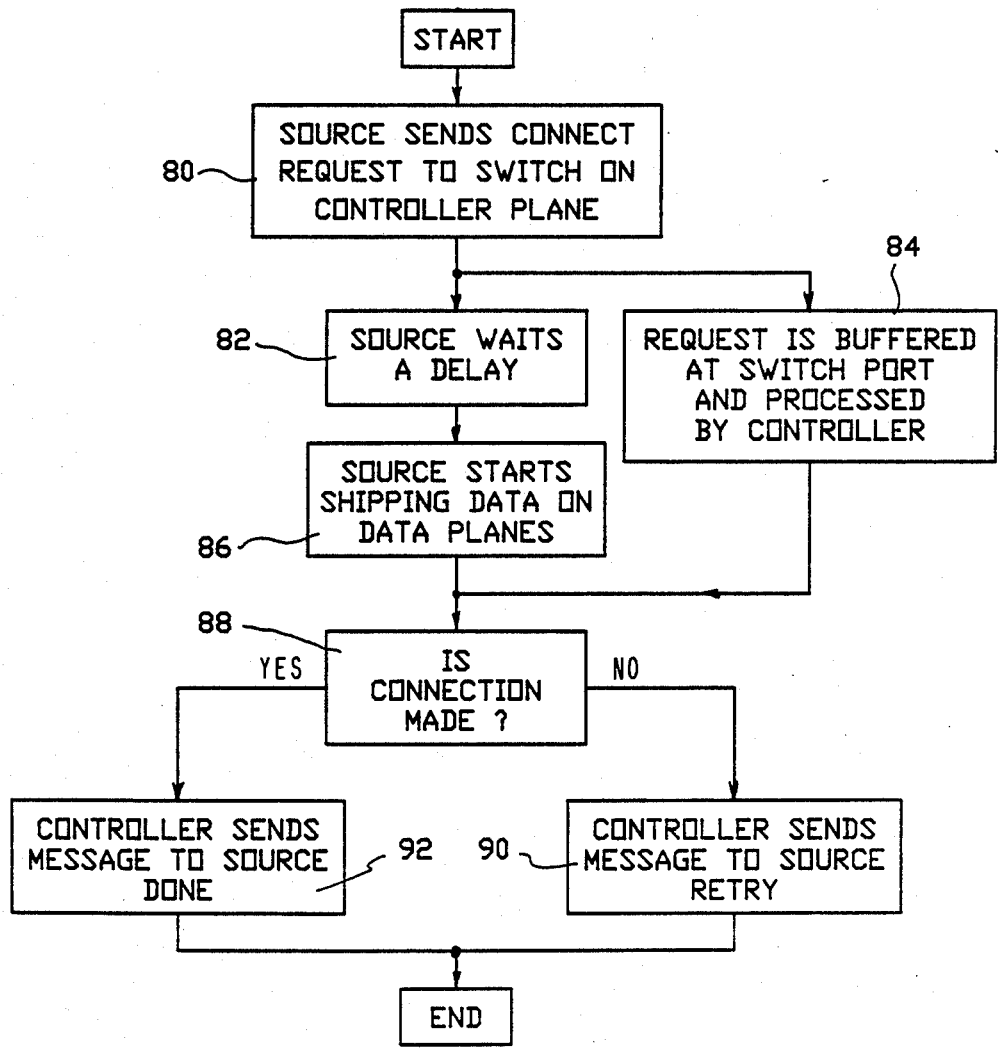
FIG. 4 is a flow chart of a controller protocol that does not require acknowledgement.

A simplified protocol that does not require acknowledgement is set forth in FIG. 4. Once the protocol begins, the source node sends a connect request to switch on the controller plane as indicated at 80. Then, the source node waits a predetermined delay time as indicated at 82, and concurrently a request is buffered at the switchboard and is processed by a matrix controller as indicated at 84. The source node then starts transmitting data on the data planes as indicated at 86. A determination is then made at 88 whether or not a connection is made. If not, the controller sends a "retry" message to the source node as indicated at 90. If the connection is made, as indicated at 92 the controller sends a message to the source node, labeled "Done" which is indicative that the connection as been made and the protocol then ends.

Figure 5A:
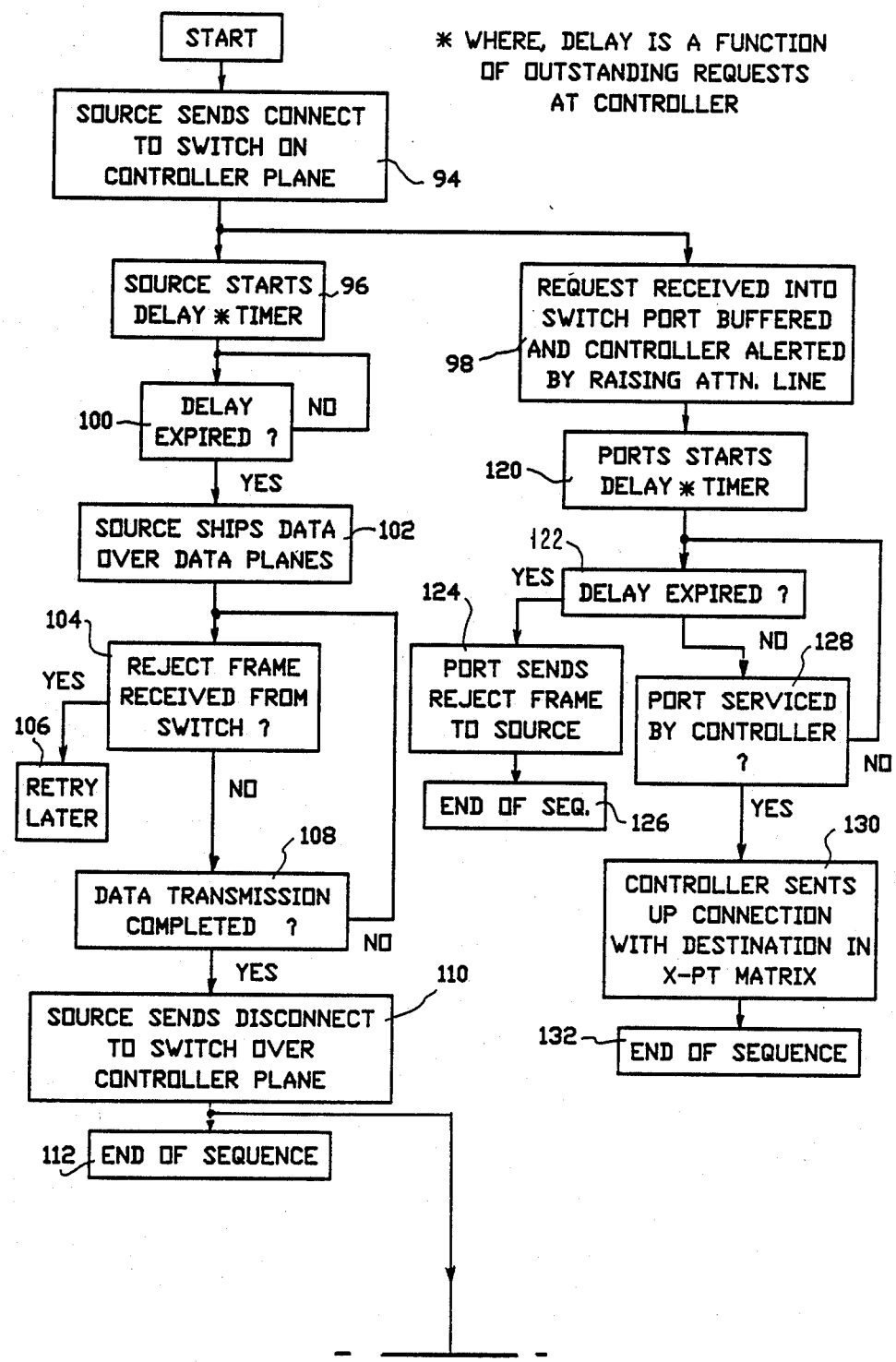
FIGS. 5A and 5B when taken together comprise a flow chart of a detailed controller protocol that does not require acknowledgement.
Figure 5B:
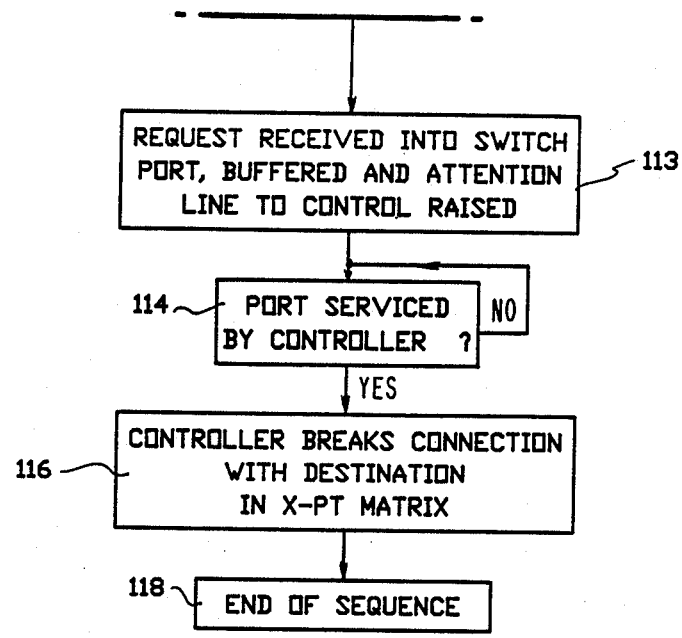

Refer to FIGS. 5A and 5B which comprise a more detailed flow chart of a protocol which does not require acknowledgment. An assumption is made that the cross-point matrix switch has 50 ports which receive requests for connection or disconnection. It is further assumed that the switch controller can service request sequentially at a rate of 100 nsecs per request.

In the worst case, there will be fifty outstanding requests for port service, or a total delay of $50 \times 100$ nsecs=5 microseconds. In the best case, there will be no outstanding requests or zero waiting time.

The probability of the worst case occurring is minimal. Thus, if one looks at the average case, it is found that there are, for example, 10 outstanding requests. This means that when a new request arrives at the switch. It will be serviced after $10 \times 100$ nsec=1 microsecond. There will be, of course, some requests that will wait less time and others that will wait longer than one microsecond. In the latter case, the request will not be serviced, but a reject frame will be issued by the switch port to the source node, indicating the need for a retry. The delay for initiating the transmission of data from the source node to the switch or sending the reject frame from the switch to the source node can be made programmable (by setting the value of the counter at the switch port) and adjusting it to the traffic requirements of the system. This method minimizes the round trip transmission delay for setting up a path through the cross-point matrix. The protocol functions as follows:

A source node sends a connect request to the switch on the controller planes as indicated at 94. Then, 2 parallel paths are begun by the protocol. At 96 (the first path which describes the protocol activity at the source) the source starts a delay timer, and at 98 (the second path) the request is received into the switch port, buffered and the controller alerted by the port raising the attention line as indicated at 98. The first path of the protocol deriving from logic block 96 will now be followed. As indicated at 100, a determination is made as to whether or not the delay has expired. Once the delay has expired, the source node then ships data over the data planes as indicated at 102. A determination in then made at 104 as to whether the retry frame has been received by the switch. If the answer is yes, a retry is to be made later as indicated at 106. If not, a determination is then made if the data transmission is complete as indicated at 108. If not, the protocol then loops back to 104. If so, the source then sends a disconnect request to the switch over the controller plane as indicated at 110. An end of sequence is then complete as indicated at 112. This concludes the protocol sequence at the source. The disconnect request is then received into the switch port, buffered and the attention line to the controller is then raised as indicated at 113. The port waits to be serviced by the controller as indicated at 114. Once the port has been serviced, the controller brakes the connection with the destination in the cross-point matrix as indicated at 116 and the end of sequence is completed as indicated at 118.

Returning to the second path as indicated at 98 which reflects the activity at the switch, the port, when it receives the connect request, starts a delay timer as indicated at 120. A determination is then made as to whether or not the delay has expired as indicated at 122. If the delay has expired, the port then sends a reject frame to the source node as indicated at 124 and an end of sequence takes place as indicated at 126. If the delay has not expired, a determination is made whether or not the port has been serviced by the controller as indicated at 128. If not, the protocol loops back to 122. If so, the controller sets up a connection with the destination in the cross-point matrix as indicated at 130, and an end of sequence occurs at 132.

In summary, the architecture of a switching system using outband signaling techniques has been described. As a result of the separation of the transmission of data from the signalling information, it is possible to construct switching planes with very low hardware complexity. This, in turn, results in the realization of a compact and inexpensive high performance switching system which approaches the complexity of optical switching without, however, the latency and capacity problems associated with such technologies.

Industrial Applicability

It is an object of the invention to provide an improved switching system.

It is another object of the invention to provide an improved optical switching system. It is yet another object of the invention to provide an improved switching apparatus and protocol to provide switching between processor system devices.

It is still another object of the invention to provide an improved optical switching apparatus and protocol utilizing outband signalling to provide switching between processor system devices.

Having thus described my invention, what I claim as new, and desire to secure by Letters Patent is:

1. A method of operating a switching system by automatically switching optical signals between pairs of a plurality of nodes, with each pair of nodes comprising a source node and a destination node, with there being a fiber optic link connected to each such node for carrying an optical signal, with there being an optical detector connected to each fiber optic link connected to a source node for converting the optical signal to an electronic signal and there being an electronic detector connected to a destination node for converting a provided electronic signal to an optical signal, with there being an electronic cross-point switch response to a control signal from a controller for selectively connecting a source node to a destination node by connecting the electronic signal from the optical detector associated with the source node to the electronic detector associated with the destination node, said method comprising the steps of:

requesting said controller by said source node to be connected to a destination node;

starting a delay timer by said source node to provide the elapse of an adjustable delay time which is a function of system traffic requirements;

sending initial optical signals by said source node following the elapse of said adjustable delay time;

determining if said controller has made the connection between said source node and said destination node;

retrying requesting said controller by said source node to be connected to the destination node if the connection has not been made;

sending a disconnect request from said source node to said controller if the connection has been made, and if the sending of optical signals by said source node is complete; and disconnecting said source node and said destination node by said controller in response to said disconnect request.

2. The method of claim 1, including the steps of:

starting a delay timer by said controller to provide the elapse of an adjustable delay time, following the connection request from said source node;

sending a retry connection request to said source node if said destination node is busy at the elapse of said adjustable delay time; and connecting said source node to said destination node if said destination node is not busy at the elapse of said adjustable delay time.

* * * * *